E. W. SCOTT.
Cicular Saw Set.
No. 6,817.
Patented Oct. 23, 1849.
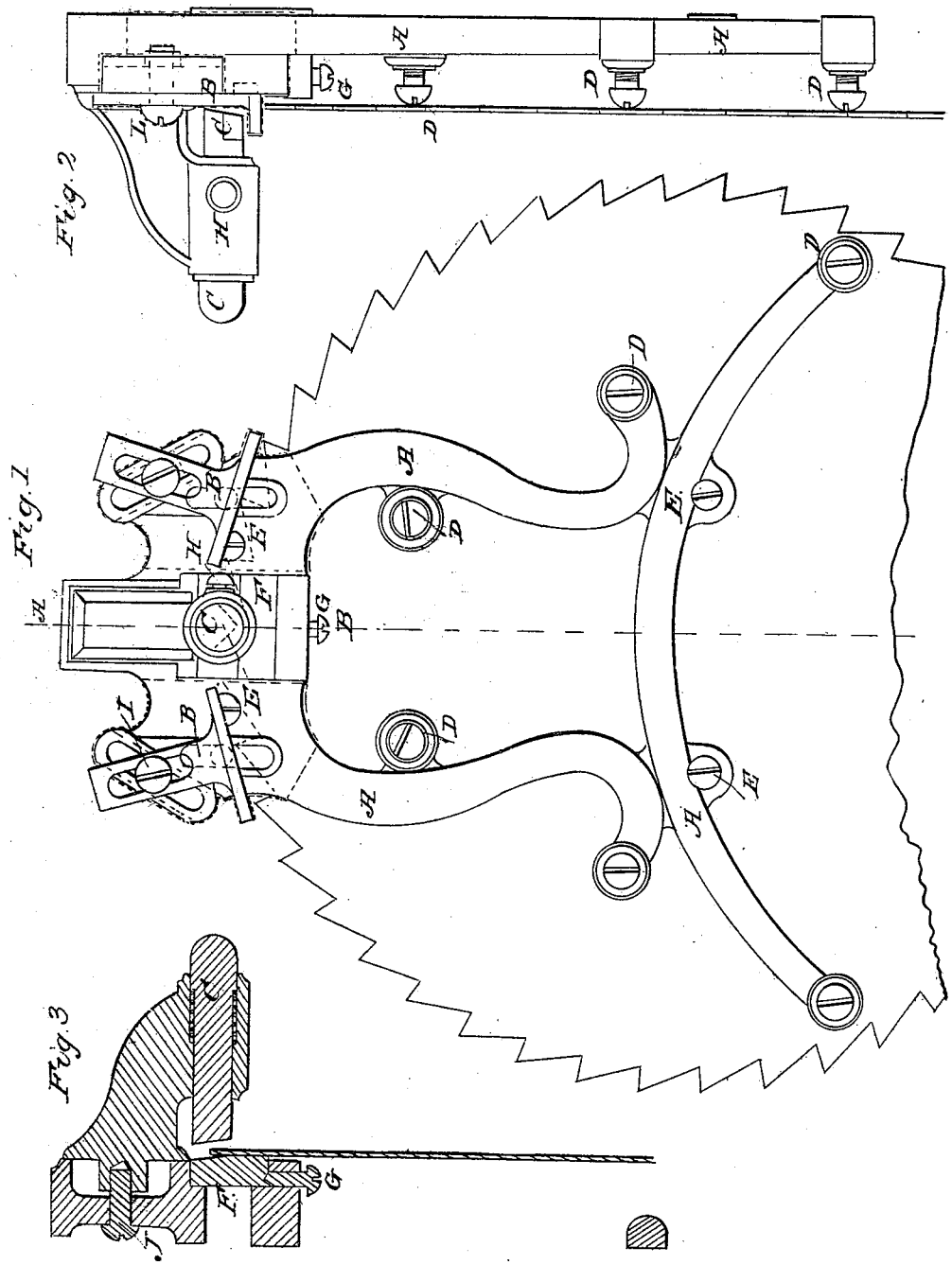

UNITED STATES PATENT OFFICE.

ELHANAN W. SCOTT, OF LOWELL, MASSACHUSETTS.

CIRCULAR-SAW SET.

Specification of Letters Patent No. 6,817, dated October 23, 1849.

*To all whom it may concern:*

Be it known that I, ELHANAN WINCHESTER SCOTT, of Lowell, county of Middlesex, and State of Massachusetts, have invented a new and useful Improvement in Circular-Saw Sets; and I do hereby declare that the same is fully described and represented in the drawings making part of this specification.

Of the said drawings Figure 1 denotes a top view Fig. 2 a side elevation Fig. 3 a horizontal transverse and vertical section at A, B, Fig. 1.

A in Figs. 1 and 2 represents the foundation or bed piece.

My invention and improvement consists in the parts shown and included in the blue lines namely the diagonal and angular moving gages B B Figs. 1 and 2 with the parts to which they are immediately connected, they being made and secured so as to be moved and confined in any position to give the proper gage or regulation to the teeth of large or small saws.

The advantage and improvement of this combination over other machines for setting circular saws is in dispensing with the complication and expense of the old set and also the saving of time and the simplicity and cheapness of construction and operation and perfect results of my improved set as will be seen by drawings compared with the old way. C in Figs. 1 and 2 the spring punch for setting the teeth.

D, Figs. 1 and 2, are the support screws to rest the saw on.

E, Fig. 1, are holes for wood screws to confine the set to a bench if desired.

F in Figs. 1 and 3 is the steel bed or anvil on which the saw rests.

G, Figs. 1, 2 and 3, is a screw to hold the anvil stationary.

H, in Figs. 1 and 2, is the stop screw to the spring punch.

I, Figs. 1 and 2, are the screws for confining the diagonal and angular moving gages.

J, Fig. 3, is the screw to hold the two parts of the casting together. The saw and manner in which it is placed relative to the gages is shown in red lines on the drawing.

What I claim as my improvements and desire to secure by Letters Patent is—

The diagonal and angular adjustable slotted gages attached to the set in the manner and for the purposes herein described.

ELHANAN WINCHESTER SCOTT.

Attest:
E. A. ALGER,
H. A. ALGER.